United States Patent [19]

D'Annessa et al.

[11] Patent Number: 4,971,614
[45] Date of Patent: Nov. 20, 1990

[54] METHOD AND APPARATUS FOR MAKING OPTICAL FIBER PREFORM RODS

[75] Inventors: Anthony T. D'Annessa, Marietta; Ray S. Elliott, Lawrenceville, both of Ga.

[73] Assignee: AT&T Bell Laboratories, Murray Hill, N.J.

[21] Appl. No.: 251,162

[22] Filed: Sep. 29, 1988

[51] Int. Cl.[5] .......................................... C03B 37/018
[52] U.S. Cl. ........................................ 65/3.12; 65/13; 65/18.2; 118/730; 285/187
[58] Field of Search ......................... 65/3.12, 13, 18.2; 118/503, 730, 733; 427/163; 285/187, 348, 356

[56] References Cited

U.S. PATENT DOCUMENTS

| | | | |
|---|---|---|---|
| 3,951,101 | 4/1976 | Karakawa et al. | 118/503 |
| 3,954,291 | 5/1976 | Gonner | 285/356 |
| 4,078,832 | 3/1978 | Wittman | 285/187 |
| 4,239,266 | 12/1980 | Mynhier | 285/348 |
| 4,280,829 | 7/1981 | Sheth | 118/730 |

*Primary Examiner*—Joye L. Woodward
*Attorney, Agent, or Firm*—Edward W. Somers

[57] ABSTRACT

In one manufacture of a preform rod from which optical fiber is drawn, chemical materials are moved into a rotating preform tube to which is applied a moving zone of heat. Following a deposition mode, the tube is collapsed to provide the preform rod. Provisions must be made to supply the deposition materials from a rotating supply conduit into the rotating preform tube without leakage and without the ingress of contaminants while an end portion of the tube is gripped securely. This is accomplished by providing non-metallic ferrules about an end portion of the preform tube which are caused to be clamped against the end portion of the preform tube in sealing and gripping engagement therewith. Also, because of the differences in the coefficients of thermal expansion of the materials of the preform tube and of portions of the apparatus, and because of heat-induced creep of the ferrules, and of other portions of the apparatus, provisions are made to cause a sealing, gripping engagement of the ferrules with the preform tube to be maintained during the deposition and the collapse modes.

2 Claims, 5 Drawing Sheets

METHOD AND APPARATUS FOR MAKING OPTICAL FIBER PREFORM RODS

TECHNICAL FIELD

This invention relates to methods of and apparatus for connecting two tubes. More particularly, this invention relates to a connector for connecting a rotating preform tube to a tube which is connected to a source of materials for vapor deposition within the preform tube to provide a preform from which optical fiber is drawn subsequently.

BACKGROUND OF THE INVENTION

In the manufacture of preforms from which optical fibers may be drawn that are suitable for use as telecommunication lightguides, vapors of materials, such as $SiCl_4$, are entrained in an oxidizing carrier gas such as oxygen. The vapor stream is then flowed into a rotating glass substrate tube which is made of quartz, for example, and which is being traversed by a torch. As the vapor stream encounters a zone of heat generated by the torch, oxide particles are formed which deposit on and fuse to the interior wall of the tube. After a predetermined number of oxide layers have been built up in the tube to form a preform tube, the tube, except for its end portions, is collapsed into a solid preform rod, from which fiber may be drawn. The hereinbefore described process is generally known as the modified chemical vapor deposition or MCVD process. For purposes of this discussion, both the substrate and the preform tubes will be referred to as the preform tube.

In the MCVD process, the tube is mounted in a lathe with each tube end held in a rotatable chuck. In order to inhibit the vapor stream from leaking to ambience and ambient air from entering and thereby contaminating the vapor stream with water vapor, a rotary seal is employed at the juncture of stationary and rotary conduits of the lathe through which the vapor stream is introduced into the preform tube. Additionally, oxygen, a component of the vapor stream itself, is often flowed under pressure over an end portion of the preform tube near the tube inlet as an added precaution to inhibit ambient air from entering the tube.

At the lathe headstock end of the preform tube, a rotating conduit which is connected to a source of material used in deposition must be connected to an end portion of the glass preform tube in which the materials are to be deposited. Generally, an end portion of the conduit is received in one end of a passageway which extends through a connecting member or is integral therewith. An end portion of the glass preform tube is received in the passageway at the other end of the connecting member. The diameter of the passageway at the other end of the connecting member is larger than that of the predorm tube to permit a plurality of non-metallic ferrules to be disposed about the end portion of the preform tube which is received in the passageway of the connecting member. Metallic rings are interposed between the non-metallic bands. A clamping nut having internally disposed threads at one end is turned over an externally threaded extension of the connecting member. As it is turned onto the connecting member, the clamping nut causes the ferrules to be compressed into sealing and gripping engagement with the end portion of the preform tube and a sealing surface which defines the passageway hereinafter referred to as the passageway sealing surface.

Non-metallic ferrules are used to ensure a sealed engagement with the preform tube. Because of the material of which they are made, that is, typically glass-filled TEFLON ®, an E.I. duPont de Nemours and Company polymer product, the ferrules are compressed into compliant engagement with the preform tube and the passageway sealing surface.

With the heat energy which is applied to the preform tube during a depositon mode and during a collaspe mode, the ferrules soften and undergo stress relaxation. This results in creep of the ferrule material. Although there would be some creep because of the difference in temperature during installation and subsequent ambient temperature, the creep is aggravated because of the relatively high temperatures used during the deposition mode and during the collapse mode.

When the ferrules undergo softening and creep, the engagement of the ferrules with the tube and the passageway sealing surface becomes less than satisfactory. Portions of the materials which are in vaporous form and which are being flowed through the tube supply conduit may escape and contaminants from the ambient atmosphere may enter the conduit. Also, when the opposite end portion of the preform tube or rod is subjected to the zone of heat, any gripping of that end portion at that end is diminished. This in effect causes the preform tube or rod to behave as a cantilever beam. For the tube or the rod at this stage to have adequate support, the ferrules must provide a suitable gripping engagement with the end portion of the preform tube or rod.

Accordingly, because of the creep of the ferrules, steps must be taken to maintain the sealed, gripping engagement of the ferrules with the preform tube and the passageway sealing surface. This is accomplished by an operator, generally at the end of the deposition mode and prior to collapse, who causes the clamping nut to be tightened.

The tightening of the clamping nut may cause another problem. Typically, abutting faces of adjacent ferrules and rings are beveled. As the clamping nut is tightened, it is not uncommon for the thinnest portion of a ferrule to be extruded between an adjacent metallic annular portion and the preform tube. The reconfiguring of a ferrule to accommodate such extrusion may cause its beveled surface to become irregular thereby reducing the area for pressure contact with a threaded extension of the connecting member over which the clamping nut is turned.

Also, as the nut is tightened and portions of at least the ferrule closest to the tailstock are extruded, resistance builds to further extrusion. Then as the nut may be further tightened with reactive forces being applied to the inner thickest portion of the ferrule, forces are caused to be applied by a center portion of the ferrule radially inwardly against the tube. This may result in breakage of the tube. Not only is the preform tube itself relatively expensive, but the breakage just prior to collaspe, which is when the tightening typically occurs, results in the scrapping of a preform tube in which the deposition has taken place and hence in which there is substantial investment.

Another problem occurs because the ferrules are made of a compliant, non-metallic material. A compliant seal with the tube is not achieved with a metallic ferrule. Because the coefficient of expansion of the metal bands and connecting member as well as that of the nut is greater than that of the glass preform tube, the metal portions during the heating process tend to move away from the ferrules thereby resulting in a loosening of the joint between the preform tube and the connecting member.

Further, in current MCVD processes, one technique involves the use of a roller which is caused to engage the rotating preform tube to straighten the preform tube before fiber is drawn therefrom. It has been found that maintenance of the clamping or gripping force at the connection of the preform tube to the supply conduit is critical during this operation, otherwise, distortion of the tube could occur.

In order to keep the clamping nut as cool as possible in an attempt to minimize ferrule creep, the clamping nut is somewhat enlarged to allow the provision of cooling fins. A prior art rotary connector with its cooling fins occupy a portion of the length of the preform tube which becomes unusable. Bearing in mind that each fraction of length of the preform tube represents a substantial investment, it would be most beneficial to reduce that length of the preform tube over which the connector extends.

What is needed and what seemingly is not available in the prior art is a connector which is self-tightening during its use. The sought-after connector should be usable with any tube to connect the tube with another tube and should be capable of being incorporated easily into a lathe which is used in the MCVD process by retrofitting the lathe.

SUMMARY OF THE INVENTION

The foregoing problems of the prior art have been overcome with the methods and apparatus of this invention which provide a sealed connection between two tubes. An apparatus for providing such a connection includes a connecting member having a passageway therethrough for receiving an end portion of a glass preform tube which is being turned rotatably about its longitudinal axis and another tube through which materials are being moved into the rotating preform tube. A sealing member is adapted to be disposed about the end portion of the rotating preform tube in proximate engagement with an inner wall of the connecting member. Upon the application of suitable forces to the sealing member, the sealing member engages the preform tube and the passageway sealing surface to prevent the egress of the materials being flowed therethrough and the ingress of contaminants into the tube. Also, the application of suitable forces to the sealing member causes the sealing member to clamp suitably the end portion of the preform tube.

A clamping member includes a housing adapted to be assembled to the connecting member. The housing includes a moveable portion having a camming surface which is adapted to cooperate with a beveled surface of a ferrule sealing member to urge the ferrule sealing member into sealing, gripping engagement with the preform tube and the passageway sealing surface.

The clamping member also includes an energy storage device which is adapted to cooperate with the movable portion to cause the movable portion to apply the suitable forces to the sealing member. In a first position, the movable portion of the clamping member is bottomed in engagement with a wall which defines a cavity in which the energy storage device is disposed. Upon assembly of the clamping member with the connecting member, the moveable portion of the clamping member becomes moved to a second position. In its second position, the energy storage device is effective to cause the displaced, movable portion of the clamping member to apply sufficient forces to the sealing member to cause the sealing member to be maintained in sealed, gripping engagement with the end portion of the preform tube and a passageway sealing surface continuously throughout the process.

BRIEF DESCRIPTION OF THE DRAWING

Other objects and features of the present invention will be more readily understood from the following detailed description of specific embodiments thereof when read in conjunction with the accompanying drawings, in which.

DETAILED DESCRIPTION

Figure 1:
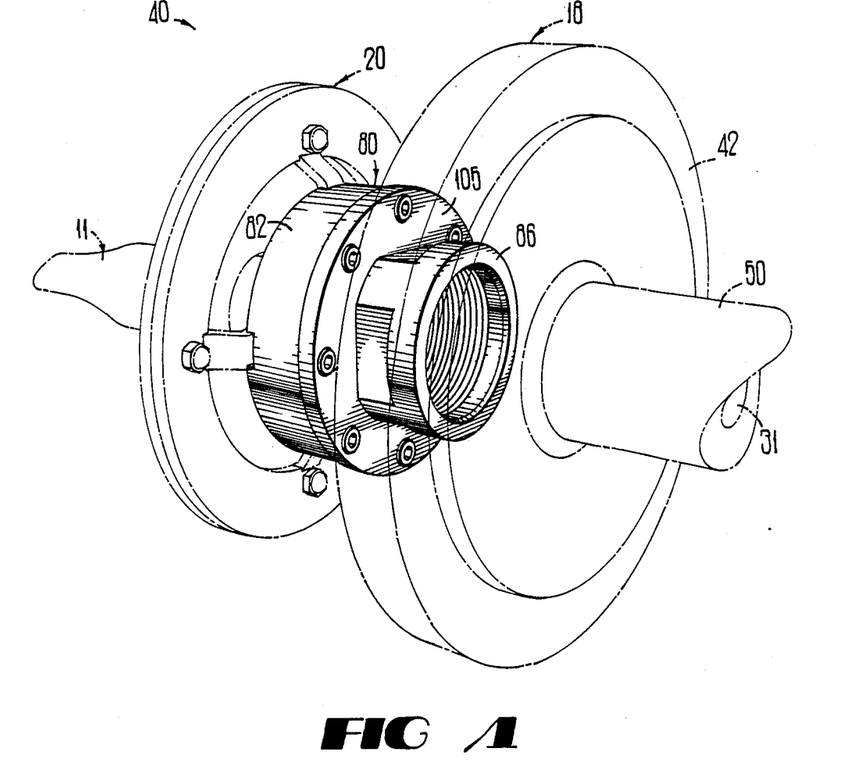
FIG. 1 is a perspective view of a portion of a lathe and of a connective arrangement in which a tube is mounted and turned rotatably while a zone of heat is moved therealong in a deposition mode to provide a suitable preform tube which is collapsed subsequently to provide a preform rod from which optical fiber is drawn.
Figure 2:
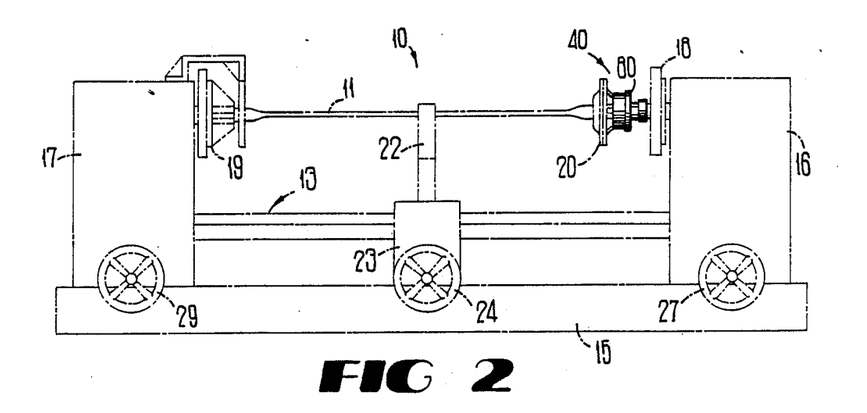
FIG. 2, is an overall schematic view of the lathe.

Referring now to FIG. 1, there is shown a portion of an apparatus 10 (see FIG. 2) for forming an optical preform by the MCVD process during which chemical reaction products are formed and deposited on the interior surface of a quartz preform tube 11 that has for example, a coefficient of thermal expansion of $0.75 \times 10^{-6}$ cm/cm/°C. The apparatus 10 includes a lathe 13 which includes a frame 15 on which a headstock 16 and a tailstock 17 are mounted. The headstock 16 and its internal mechanisms rotatably support and drive a chuck 18, and the tailstock 17 and its internal mechanisms similarly rotatably support and drive another chuck 19 about a common axis with that of chuck 18. The chuck 18 is adapted to be moved into and out of gripping engagement with the preform tube or with a heat-resistant shroud wrapped thereabout. Centrally apertured heat shields 20—20 are mounted to both stocks closely adjacent to the rotatable chucks. A hydrogen-oxygen torch 22 is mounted on a carriage 23 for reciprocal movement between the two heat shields. The torch is reciprocated by an unshown, automatic drive mechanism which can be manually overridden for torch positioning by means of a hand-wheel 24. Similarly, the lateral position of the headstock 16 may be adjusted by a handwheel 27 and the position of the tailstock may be manually adjusted by movement of a handwheel 29.

During chemical vapor deposition, the preform tube 11 is rotated by the chucks 18 and 19. A vapor stream is flowed into the preform tube by an unshown vapor stream generator. As the vapor stream is passed into the preform tube, the torch 22 is slowly moved along the rotating preform tube in a predetermined number of passes from the headstock 16 towards the tailstock 17 thereby causing a chemical reaction to occur within the zone of heat provided by the torch. Products of this reaction then deposit on and fuse to the interior surface of the preform tube. Any undeposited reaction products are exhausted out of the preform tube 11 through an exhaust tube. Some of the heat so generated is, of course, conducted along the preform 11 to the tube-holding chucks at each of its ends. See U.S. Pat. No. 4,217,027 which issued on Aug. 12, 1980 in the names of J.B. MacChesney, et al., and which is incorporated by reference hereinto.

As can be seen in FIG. 1, the apparatus 10 includes provisions for connecting the preform tube 11 which is being rotated about its longitudinal axis to a supply tube or conduit 31 into which chemical materials are being moved for the deposition mode. It is important that the connection between these two tubes be sealed so as to prevent the escape of vaporous material being moved therethrough and to prevent the ingress of contaminants.

To this end, the apparatus 10 includes a connector which is designated generally by the numeral 40. Typically, the chuck 18 includes a coupler flange 42 (see FIG. 3) having a passageway 44 extending therethrough and being defined by a passageway sealing surface 45. The supply tube 31 has an end portion 48 received in one end of the passageway 44 or the supply tube may be formed integrally with the coupler flange.

It should be noted that the portion of the usable preform tube does not extend into the connector 40. Therefore, when the preform tube 11 is collapsed to form a preform rod, the rod does not extend into the connector but transitions into the end portion of the tube which is still gripped in the connector.

Figure 3:
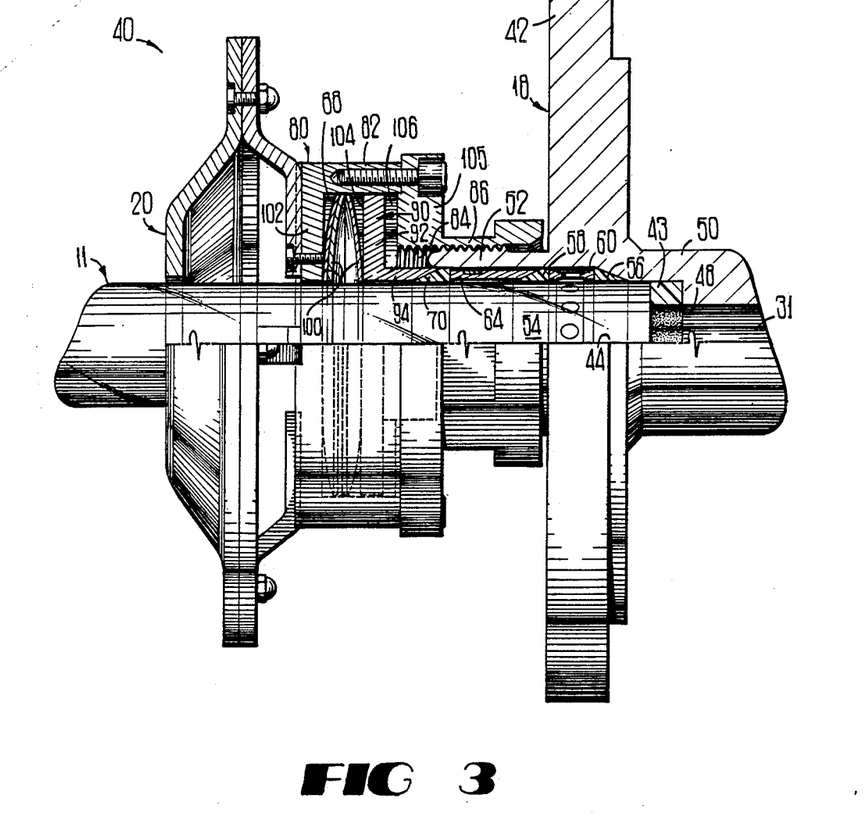
FIG. 3 is an elevational view in section of a connector which is used to connect the rotating tube and a conduit through which are flowed chemical materials for use during the deposition mode.

The coupler flange 42 includes a hub 50 into which the supply tube end portion 48 is inserted. The supply conduit 31 abuts a stop 43 which is disposed in the hub 50. Also, the flange 42 includes an oppositely extending portion 52 which is threaded externally. The passageway 44 extends through the portion 52 and through the hub. The portion of the passageway 44 in which is received the end portion of the preform tube has a diameter which is greater than that of the preform tube.

One end portion 54 of the preform tube 11 is provided with a pair of ferrules 56 and 58. Each of the ferrules 56 and 58 is an annulus and may be made of a glass filled TEFLON material. An inner diameter of each ferrule 56 and 58 is such that it is in relatively close-fitting engagement with the glass tube 11. An outer diameter of each ferrule is such that each ferrule is displaced slightly from an inner wall of the extending portion 52 or in touching contact therewith.

Interposed between the two ferrules 56 and 58 is a purge ring 60. The purge ring 60 is disposed about the end portion of the preform tube 11 and generally is made of a metallic material. The purge ring 60 includes a plurality of radially disposed bores through which a purging gas is provided.

It should be observed from the drawings that each of the ferrules 56 and 58 has a transverse cross sectional configuration which is a right triangle. Further as can be seen in drawings, the ferrules 56 and 58 are arranged so that the portions thereof which have the largest outer diameter are disposed contiguously to the purge ring 60.

Figure 4:
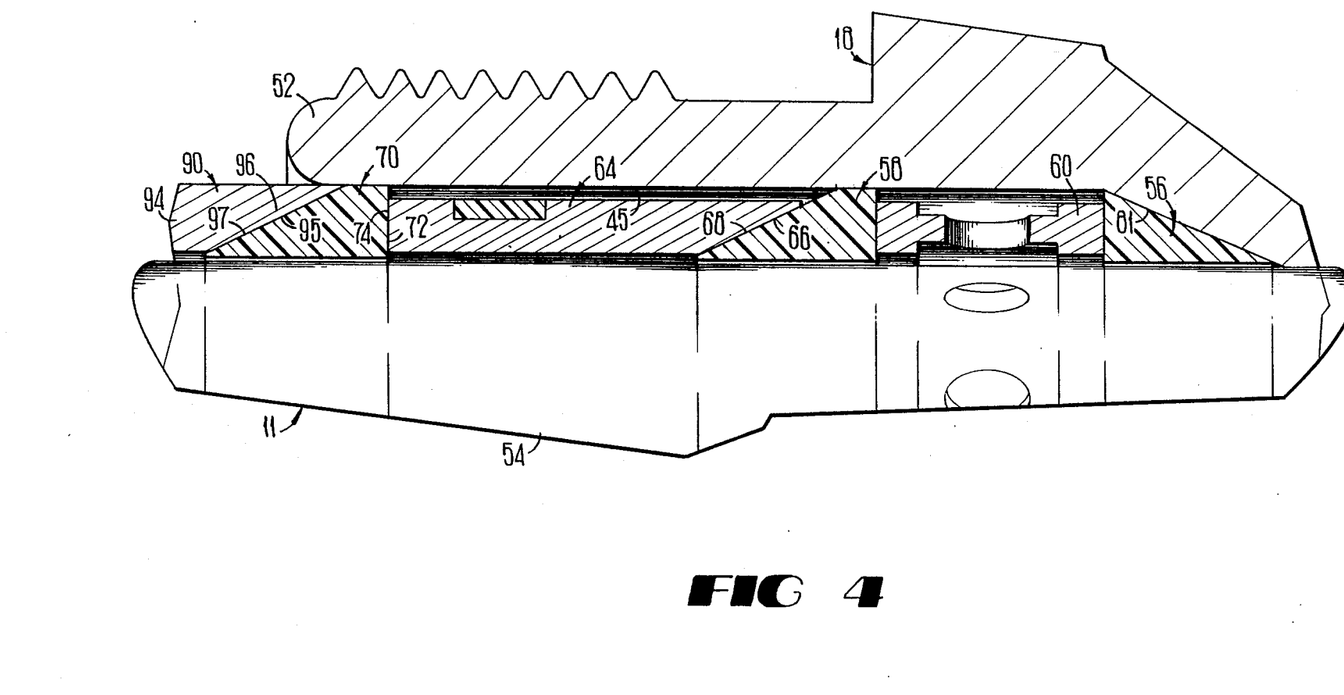
FIG. 4 is an enlarged detail view of a portion of the connective arrangement of FIG. 1.

Disposed adjacent to the ferrule 58 and concentrically about the substrate tube is a metallic band (see FIGS. 3 and 4). The band 64 is trapezoidal in cross sectional shape and includes a sloping face 66 which engages a sloping face 68 of the ferrule 58. The inner diameter of the band 64 is such that it is out of engagement with the tube 11.

Lastly, along the preform tube 11 prior to the insertion of the end portion thereof into the passageway 44 of the coupler flange 42 is an outer ferrule 70 (see FIGS. 3 and 4). Like the ferrules 56 and 58, the ferrule 70 has a right triangular cross section transverse of its circular axis. It should be apparent from FIGS. 1 and 2, that the ferrule 70 is that ferrule which is closest to the reciprocally moveable torch.

The ferrule 70 is made of a glass-filled TEFLON material and has a radial face 72 disposed in engagement with a face 74 of the metallic band 64. The inner and the outer diameters of the ferrule 70 are such that it has a snug fit with the outer surface of the preform tube 11 and such that the outermost portion thereof is in proximate engagement with the inner wall of the passageway 44.

In preparation for the deposition process, an operator prepares a preform tube by moving a clamping member in which is designated generally by the numeral 80 over the end portion of the tube. The preparation is continued by moving over its end portion adjacent to that end of it which is destined to be adjacent to the headstock of the lathe the ferrule 70 such that the wedge-shaped portion of the ferrule 70 is oriented toward the other end of the preform tube. This is followed by the metallic band 64 and the ferrule 58. Then the purge ring 60 is moved onto the preform tube 11 followed by the ferrule 56 which is to be adjacent to the supply tube. Afterwards, the end portion of the preform tube 11 is inserted into the extending portion 52 of the coupler flange to seat the sloping surface of the ferrule 56 in engagement with a mating surface 81 (see FIG. 4) of the hub 50 and engage the end of the preform tube with the stop 43.

As can be seen in FIG. 3, the clamping member 80 includes a housing 82 having a bore 84 therethrough so that the preform tube 11 can extend through the housing. The housing 82 also includes a projecting portion 86 which is internally threaded. As such, the projecting portion 86 of the clamping member 80 when disposed about the substrate rod is adapted to be turned threadably onto the extending portion 52 of the coupler flange.

Disposed within a cavity 88 of the housing 82 is a movable bushing 90. The bushing 90 is L-shaped in cross-section having a base 92 and an extension 94. As can be seen in FIG. 4, the extension 94 is configured to have an inwardly chamfered end portion 96 to provide a camming surface 95. The surface 95 of the chamfered end portion 96 is adapted to engage a beveled surface 97 of the ferrule 70.

Also disposed within the cavity 88 of the housing 82 is an energy storage device 100 (see FIG. 3). In a preferred embodiment, the device 100 is disposed concentrically about the tube 11 and comprises three compression disc springs. One of the disc springs engage an inner wall 102 which defines the cavity 88 and another one of the disc springs engages a surface 104 of the base 92 of the bushing 90.

As mentioned earlier, the bushing 90 is moveable. Prior to assembly of the housing 82 with the coupler flange 42, the base 92 of the bushing 90 is bottomed out and disposed in a first position in engagement with a wall 105 of the housing 82 under the influence of the compression springs.

As the projecting portion 86 of the housing 82 is turned threadably onto the externally threaded portion 52 of the coupler flange, the camming surface 95 of the chamfered portion 96 engages the beveled surface 97 of the ferrule 70. Further turning causes compressive forces to be applied to the ferrule 70 which exerts reactive forces on the bushing. Eventually, the reactive forces cause the bushing 90 to be moved to the left to a second position as viewed in FIG. 3 to form a gap 106 between the base 92 of the bushing and the wall 104.

This arrangement results in a pre-loading of the bushing 90. It is maintained under a sustained load as applied by the compression springs. The gap 106 is maintained by the integrity of the ferrule 70 as well as by the back-up ring 64 and the ferrules 56 and 58.

Figure 5:
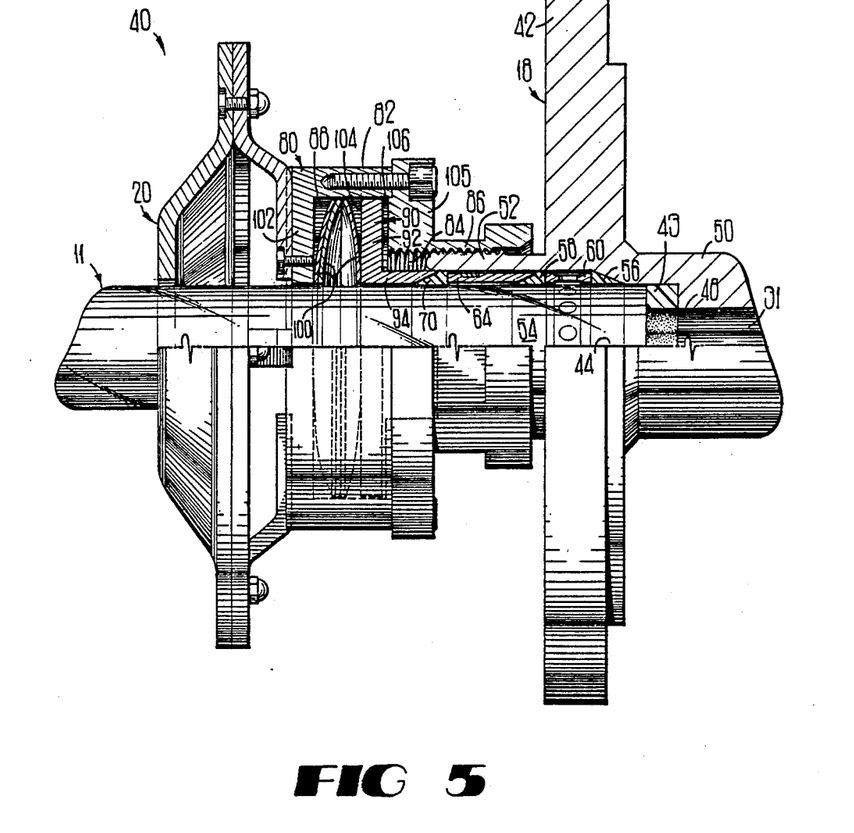
FIG. 5 is an elevational view in section of the connective arrangement following movement of a force applying member to apply forces to a sealing ferrule.
Figure 6:
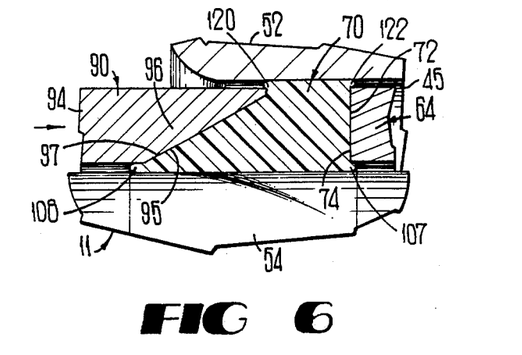
FIG. 6 is an enlarged detail view of a portion of the connective arrangement of FIG. 5 after forces have been applied to the ferrule.

When because of the high temperatures to which the connector 40 is exposed, the ferrule 70 softens and experiences creep, the spring forces overcome the resistance of the ferrule 70 and the camming surface 95 rides along the beveled surface 97 (see FIGS. 5 and 6). Also, as can be seen in FIG. 6, portions 107 and 108 of the ferrule 70 extrude between the metallic band 64 and the tube 11 and between the portion 96 of the bushing and the tube 11 respectively. Portions 120 and 122 of ferrule 70 extrude between the passageway sealing surface 45 and the portion 96 of the bushing 90 and between the passageway sealing surface 45 and the metallic band 64, respectively. This causes forces to be applied to the ferrule 70 to cause the ferrule 70 to be held in engagement with the end portion of the preform tube 11. The application of the spring forces to the bushing 90 is continuous. As a result, forces are being applied continuously to the ferrule 70 which forces have radially directed components which are effective to maintain the ferrule in compliant sealing, gripping engagement with the preform tube and the passageway sealing surface 45.

Of course, it should be readily apparent that other energy storage devices could be used to provide the sustained loading of the bushing. Other kinds of springs, or a piston and cylinder arrangement can be used.

It should also be apparent that the ferrules 56 and 58 also experience creep, but to a lesser degree than that experienced by the ferrule 70. The loading of the moveable bushing 90 by the springs causes forces not only to be applied by the ferrule 70 radially inwardly toward the preform tube but also in a direction axially of the preform tube. These axial forces are applied by the ferrule 70 to the ring 64 and thence to the ferrules 58 and 56.

Forces acting on the ferrule 58 have radially directed components that are effective to cause sealing and gripping engagement of the ferrule 58 with the passageway sealing surface 45 and the end portion of preform tube 11. Axial forces acting through ferrules 70 and 58 and the back-up ring 64 are transmitted to the purge ring 60 and hence act on the ferrule 56. The forces acting on the ferrule 56 are effective to cause sealing engagement of the ferrule 56 with the end portion of preform tube 11 and the beveled surface 81. It should be noted that the sealing engagement of the ferrule 56 with the surface 81 and the end portion of the tube 11 is a primary seal intended to prevent the escape of vaporous material or movement of external air the therepast. The other sealing engagements of the ferrules 70 and 58 are effective as back-up sealing and gripping engagements in cases where the sealing engagement of the ferrule 56 is less than adequate.

Figure 7:
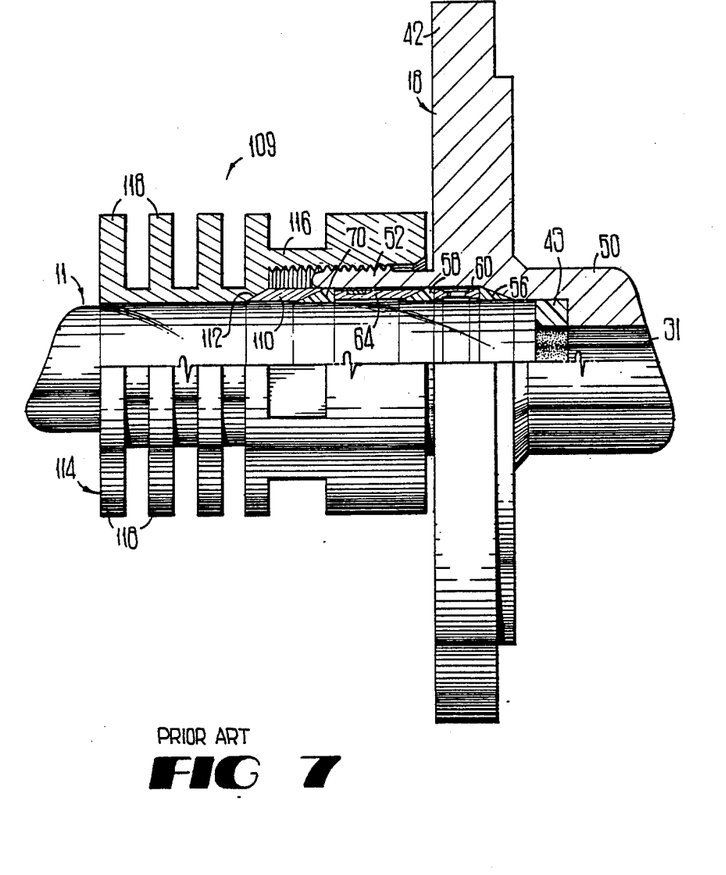
FIG. 7 is an elevational view in section of a prior art rotary connector.

The arrangment of this invention is advantageous over that of the prior art from several standpoints. As shown in FIG. 7, a prior art connecting device 109 includes the coupler flange 42 and the threaded projecting portion 52. The end portion of the preform tube is provided with the ferrule 56, the purge ring 60, the ferrule 58, the band 64 and the ferrule 70. Also, another metallic band 110 is provided between the ferrule 70 and a mating surface 112 of a clamping member 114. The clamping member 114 includes a tubular projecting portion 116 which is threaded internally. Further as can be seen in FIG. 7, the clamping member 114 is provided with a plurality of fins 118—118 to act as a heat sink to dissipate the heat in an attempt to cool the ferrule 70 which is closest to the moving zone of heat provided by the torch. When the connecting device is subject to heat, resulting in ferrule creep, an operator must turn the clamping member 114 to retighten the ferrules. It is during this retightening that breakage of the tube 11 may occur.

The apparatus of this invention maintains a sealed, gripping engagement between the ferrules and the end portion of the preform tube 11 by providing a sustained loading of the ferrule. This solves the long standing problem which occurred because of stress relaxation of the ferrules and because of the difference in coefficients of expansion. Also, inasmuch as the adverse effects of the relatively high temperatures on the sealing have been overcome with sustained loading of the bushing, the prior art finned cooling provisions are no longer necessary. As a result, the connector may be shorter in length as measured along the axis of the preform tube 11 thereby resulting in an increased amount of usable preform.

It is to be understood that the above-described arrangements are simply illustrative of the invention. Other arrangements may be devised by those skilled in the art which will embody the principles of the invention and fall within the spirit and scope thereof.

We claim:

1. A method of making a glass optical fiber optical transmission line, comprising a core section and a cladding wherein the cladding has an index of refraction of a value lower than the maximum index of the core for energy of the wavelength to be transmitted, said method comprising the steps of:

disposing a ferrule which is made of a compliant material about an end portion of a first tube which is to be turned rotatably about a longitudinal axis thereof;

inserting the end portion of the first tube which is to be rotated with the ferrule disposed thereabout into a connecting member having a passageway therethrough and a sealing surface adjacent to the passageway;

disposing a force maintaining member in engagement with the ferrule and loading the force maintaining member with an energy storage device disposed concentrically around the first tube such that the energy storage device continuously causes the force maintaining member to apply forces to the ferrule in a manner to cause the ferrule to be maintained in sealing, gripping engagement with the end portion of the first tube which is to be rotated and the sealing surface adjacent to the passageway;

connecting a second tube to the connecting member adjacent to the first tube;

introducing a moving stream of a vapor mixture including at least one compound glass-forming precursor together with an oxidizing medium through the second tube into the first tube; while rotating the first and second tubes about their longitudinal axes; and heating the first tube so as to react the mixture and produce a glassy deposit on the inner surface of the first tube, the heating of the first tube and contents being by a moving hot zone produced by a correspondingly moving heat source external to the first tube in that combustion within the first tube is avoided and in that temperature within the hot zone, composition of the vapor mixture and the rate of introduction of the vapor mixture are maintained at values such that at least a part of the reaction takes place within the vapor mixture at a position spaced from the inner walls of the first tube, thereby producing a suspension of oxidic reaction product particulate material, whereby the particulate material while traveling downstream comes to rest on the inner surface of the first tube within a region which extends from a piston within the hot zone, the moving hot zone serving the dual functions of nucleation site for homogeneous reaction to produce particulate matter and consolidation site for previously produced particulate matter;

collapsing the first tube into a rod; and drawing optical fiber from the rod.

2. An apparatus for depositing layers of materials within a tube, said apparatus including:

holding means for supporting an elongated tube having first and second end portions at the second end portion of the tube for rotation about a longitudinal axis of the tube;

supply means for supplying materials in vapor form into the first end portion of the tube;

heating means for providing a zone of heat to an external surface of the tube to heat the materials being supplied into the tube and cause reaction products thereof to be deposited in layers within the tube;

means for rotating the tube about its longitudinal axis;

means for moving said heating means along the length of the tube in a number of passes to cause each successive increment of length of the tube to become exposed to the zone of heat; and connective means for rotatably supporting and connecting the the first end portion of the tube to said means for supplying materials, said connective means comprising:

a connecting member having a passageway therethrough which is effective to receive the first end portion of the tube in a first end thereof and connected to said supply means adjacent to a second end thereof and having a sealing portion comprising an annular sealing surface adjacent to the second end, said sealing surface having at least one beveled portion with a smallest diameter of said beveled portion being adjacent to the second end of said connecting member which is adjacent to said supply means and a largest diameter of said beveled portion being adjacent to the first end of said connecting member;

annular sealing means comprising a plurality of ferrules disposed about the first end portion of the tube which is received in said passageway of said connecting member with each being provided with at least one outwardly facing beveled surface with a first of said ferrules spaced from an end of the first end portion of the tube and a last of said ferrules adjacent to the end of the first end portion of the tube for engaging said at least one beveled portion of said sealing surface, each of said ferrules being made of a resilient material which engages an outer surface of the tube and an adjacent portion of said sealing surface with sufficient compliancy to prevent the movement of vaporous materials therepast;

at least one annular spacing member comprising a ring disposed about the first end portion of the tube, any such annular spacing members being interposed alternately between adjacent ones of said ferrules and having surfaces which mate with adjacent surfaces of adjacent ferrules;

clamping means including a housing portion attached to said connecting member and further including a movable portion which has a sleeve portion engaging said first ferrule of said annular sealing means; and energy storage means disposed in said housing portion concentrically about the tube for causing said sleeve portion of said movable portion to be maintained in continuous uniform engagement with said first ferrule of said annular sealing means and for applying continuously compressive uniform axial forces to said plurality of ferrules which are effective to cause said plurality of ferrules to apply radial forces to the first end portion of the tube and to said annular sealing surface to cause said plurality of ferrules to be maintained in coninuous sealing, gripping engagement with said sealing surface of said sealing portion and with the outer surface of the first end portion of the tube, said energy storage means comprising a spring engaging said moveable portion of said clamping means.

* * * * *